(No Model.)
W. BRADLEY.
CONDUIT FOR ELECTRIC RAILWAYS.
No. 476,603. Patented June 7, 1892.
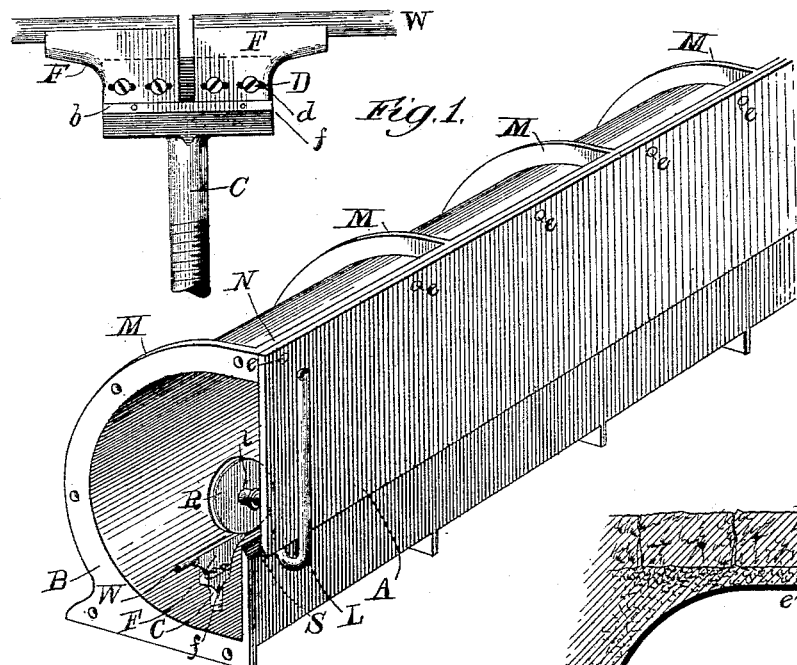
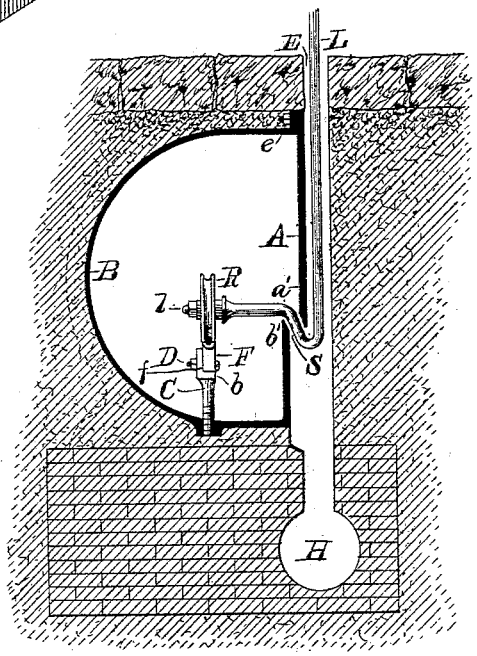
Witnesses:
Chas E Gaylord
W S Hulse
Inventor:
William Bradley
By H. C. Hartman
Atty.

UNITED STATES PATENT OFFICE.

WILLIAM BRADLEY, OF FORT WAYNE, INDIANA.

CONDUIT FOR ELECTRIC RAILWAYS.

SPECIFICATION forming part of Letters Patent No. 476,603, dated June 7, 1892.

Application filed June 22, 1891. Serial No. 397,008. (No model.)

*To all whom it may concern:*

Be it known that I, WILLIAM BRADLEY, a citizen of the United States, residing at Fort Wayne, in the county of Allen, in the State of Indiana, have invented certain new and useful Improvements in Conduits for Electric Railways; and I do hereby declare that the following is a full, clear, and exact description of the invention, which will enable others skilled in the art to which it appertains to make and use the same, reference being had to the accompanying drawings, which form part of this specification.

My invention relates to improvements in conduits for electric railways; and its objects are to provide an improved conduit which shall better prevent the entrance of foreign substances into it and which shall be more convenient in its construction and economical in use, and which shall provide for improved and complete drainage of any water which may enter the slot from the surface through which the supporting-arm of the contact devices passes. I attain these objects by the mechanism illustrated in the accompanying drawings, in which—

Figure 1 is a perspective view of the conduit with trolley-wheel adjusted on wire. Fig. 2 is a vertical cross-section of the conduit placed in the ground with drain. Fig. 3 is a side elevation showing the adjustment of the wire to the standard C.

Similar letters of reference refer to similar parts throughout the views.

My improved conduit consists in forming the slot on the side of the conduit by making an upper plate A removable and constructing the other part B, preferably semicircular in form, with a part $b'$, extending vertically up the side, so as to form with the plate A the slot S, and extending a slot E from the surface down one side of the box or pipe below it into a drain.

The upper plate A of the conduit projects on one side $a'$ over the lower part $b'$, so as to form the entrance-slot $s$ between the two parts to the interior on that side of the conduit for the supporting-arm L to pass through into the conduit and operate freely, it being immaterial whether a trolley, as shown in the drawings, or other contact device is used to collect the current from the conductors. The arm L is of any suitable size and shape to support the contact devices and afford a connection to the motor. I prefer to have the side $a'$ of the upper part extend slightly down below the level of the top of the other side $b'$, as shown, because such construction more effectually prevents the entrance of dirt and other substances into the interior of the conduit. This is the preferable construction for such slot; but the two parts $a'$ and $b'$ of the sides may be, if desired, in perpendicular line with each other, in which case the slot between them will have to be wider to permit the necessary play of the arm L, and in such case any dirt which may fall on the angle of the arm L is more liable to be jarred off into the conduit.

Within this conduit I attach firmly, preferably on the bottom, a standard C, preferably of compressed fiber or other insulating material, to support and hold extended the conductor-wire W. Such attachment is preferably made by forming on the lower end of the standard a screw-bolt and tapping it into the lower or bottom part of the conduit, as shown in Figs. 1 and 2. I also adapt this standard C so as to support and firmly hold the flange F, which flange is firmly attached to the wire W, preferably by soldering it thereto. A preferable method of attaching the flange F to the standard is shown in Figs. 2 and 3. It consists in cutting out a rabbet $f$ on the upper part of the standard for the flange to rest on and securing the flange thereto by nuts and bolts D. These flanges F rest on a conducting-plate $b$, secured to the standard, which forms a connection for the current to pass from one section of the conducting-wire to the next one. The bolts D pass through the slots $d$ in the flanges, holding the conductor-wire W firmly thereto, but permitting a lineal movement of the flange for the purpose of providing for any expansion or contraction of the wire W which may occur from changes in temperature. By such construction the wire W is held in a straight line and may be of a very large size, if desired.

The standards C are placed at suitable distances apart, so as to support the conductor-wire in a straight line without sagging. The supporting-arm L passes down through a slot E, provided in the materials inclosing the conduit, and from thence it is bent so as to pass through the slots s and form a horizontal journal l for the trolley-wheel R or other contact device to revolve or move on.

The method of conducting the current from the conductor-wire W to the motor by means of a trolley-wheel or other contact device and a supporting-arm are well known, and therefore such description is omitted.

This conduit may be placed between the rails of the railway, either above the general surface or with its top even therewith; but the construction shown makes it peculiarly adapted to be placed at one side of the track, in which case one rail can be utilized to form a guard to one side of the slot E. It is generally preferable to place the conduit slightly below the surface and to cover it over the top with flagging and put grouting on the side, forming with it the slot E, the whole being adapted to protect the conduit and preserve the slot E intact. I extend the slot E down even with the bottom of the conduit, but preferably a short distance below, and form a drain H of sufficient size to carry off all the water that can possibly enter the slot, so that the water can never fill it up as high as the slot S. This drain H is connected at suitable intervals with the city sewers or with catch-basins especially provided for it, or it may have independent outlets. Such connections are not shown, as this construction will readily occur to those skilled in the art.

For the purpose of economical construction the semicircular part or shell B is preferably made of comparatively thin metal and is reinforced by ribs M, terminating on the upper side in a longitudinal rib N, the shape and size of the ribs being calculated, in combination with the shell, to support any weight or jar that may come upon it from street travel or use.

In describing the box or pipe as semicircular in form, I mean such form is preferable; but I do not wish to confine myself to that form nor to any other. I mean by the words "semicircular in form" such curved form as will afford strength and economy of construction and permit the sides or plates forming the slot E to be of vertical construction.

Having thus described my invention, what I claim as new, and desire to secure by Letters Patent, is—

1. In a conduit for electric railways, the combination of a box or pipe with the plate A, forming the upper side a, the lower part b forming with said upper side a slot s, a slot extending from the roadway or track down to or below the bottom of the box or pipe, one side of said box or pipe forming part of one side of said slot, the same being adapted to permit the operation of a supporting-arm of a contact device and also adapted to confine within the slot the water and other substances which may enter it and conduct such substances outside the box directly into the drain, a drain placed below the bottom of said box and directly beneath said slot and communicating with it, adapted to carry off the water which may pass into it, standard C, adapted to support the trolley-wire or conductor, flanges provided with longitudinal slotted holes and attached by bolts to said standards and adapted to permit a lineal movement, and a conductor or trolley-wire attached to said flange.

2. In a conduit for electric railways, the combination of a box or pipe constructed with a longitudinal side entrance or slot for the supporting-arm of a contact device to pass through and be operated, said side entrance being formed by the upper part or vertical plate of one side of the box projecting laterally over the lower part of the same side, a slot extending from the roadway down to or below the bottom of the box or pipe, one side of said box or pipe forming part of one side of said slot, the same being adapted to permit the operation of a supporting-arm of a contact device and also adapted to confine within the slot the water and other substances which may enter it and conduct such substances outside the box directly into the drain, a drain placed below the bottom of said box and directly beneath said slot communicating with it, adapted to carry off the water which may pass into it, a trolley-wire or conductor supported within said box and adapted to permit the passage of a trolley-wheel or contact device upon or in contact with it.

3. In a conduit for electric railways, the combination of a box or pipe provided with a longitudinal slot, with a slot extending from the roadway or track to or below the bottom of the box or pipe, one side of said box or pipe forming part of one side of said slot, the same being adapted to permit the operation of a supporting-arm of a contact device and also adapted to confine within the slot water and other substances which may enter it and conduct such substances outside the box, and a drain placed beneath said slot communicating with it.

In testimony whereof I hereunto subscribe my name, in the presence of two witnesses, this 19th day of June, 1891.

WILLIAM BRADLEY.

Witnesses:
H. C. HARTMAN,
ALBERT BAKER.